United States Patent [19]

Gentry

[11] Patent Number: 5,674,418
[45] Date of Patent: Oct. 7, 1997

[54] METHOD FOR ASSEMBLING A METAL DESIGN PANEL ON A METAL SUPPORT STRUCTURE

[75] Inventor: Hollis Gentry, Rainsville, Ala.

[73] Assignee: Game Time, Inc., Fort Payne, Ala.

[21] Appl. No.: 491,401

[22] Filed: Jun. 19, 1995

[51] Int. Cl.$^6$ .................................................. B23K 9/00
[52] U.S. Cl. .......................................... 219/137 R; 482/35
[58] Field of Search ................. 219/137 R, 125.1; 29/890.038, 897.32; 482/35; 52/650.3, 651.01

[56] References Cited

U.S. PATENT DOCUMENTS

| | | | |
|---|---|---|---|
| 796,159 | 8/1905 | Smolik | 482/35 |
| 1,842,298 | 1/1932 | Smith | 219/137 R |
| 3,015,296 | 1/1962 | Mapson | 29/897.32 |
| 3,352,541 | 11/1967 | Thom | 256/21 |
| 3,838,245 | 9/1974 | Jecmen et al. | 219/137 R |
| 4,168,795 | 9/1979 | Bennett | 219/137 R |
| 4,271,622 | 6/1981 | Tippmann et al. | 40/606 |
| 4,918,611 | 4/1990 | Shyu et al. | 219/121.67 |
| 4,939,034 | 7/1990 | Sobata et al. | 428/336 |
| 5,059,492 | 10/1991 | Shindou et al. | 428/625 |
| 5,177,926 | 1/1993 | Frankel | 482/35 |

*Primary Examiner*—Clifford C. Shaw
*Attorney, Agent, or Firm*—Welsh & Katz Ltd.

[57] ABSTRACT

A method for making and assembling a metal panel with laser cut decorative designs on a metal support structure, using electric-arc welding assembly to ensure all areas are coated during powder coating.

20 Claims, 1 Drawing Sheet

5,674,418

METHOD FOR ASSEMBLING A METAL DESIGN PANEL ON A METAL SUPPORT STRUCTURE

BACKGROUND OF THE INVENTION

This invention relates to children's playground equipment, and particularly to a method for assembling a metal design panel on a metal support structure.

A large and beneficial industry has developed for making children's public playground equipment, including a variety of above-ground modular structures utilizing play components such as crawl tubes, slides, climbers, and the like. It is desirable that the platforms of such equipment be bordered by enclosures to minimize the likelihood of children falling off of the platforms. It is also desirable that the enclosures contain openings and designs which are interesting to the children and enable supervisors to observe the children continuously, but in which the children cannot become entrapped or injured. Such enclosures should be sufficiently strong and rugged not only to withstand the activities of children and to maintain integrity against the outdoor elements through changing seasons, but also to withstand attempts by vandals to burn the enclosures with matches and lighters, to mutilate designs on the enclosures, or to fracture the enclosures by assorted physical means. Plastic panels might satisfy some of these needs, but are not sufficiently rugged and vandal-proof.

The equipment should also be capable of being assembled quickly and economically. Attaching solid metal panels to a metal support structure generally satisfies these requirements, and it is quicker and more economical to coat the combined structure with the panels already attached. However, coating after assembly with screws, bolts, clamps or the like necessarily will leave areas uncoated and susceptible to early corrosion.

SUMMARY OF THE INVENTION

Therefore, it is an object of this invention to present a method for making and assembling metal panels on metal support structures.

It is an additional object of this invention that the panels be useful as a safety feature bordering platforms of playground equipment to prevent children from falling off the platforms.

It is an additional object of this invention that the panels have holes which enable supervisors to observe the children, but which are shaped so that children cannot become entrapped or injured.

It is an additional object of this invention that decorative designs such as animals be cut into the panels.

It is an additional object of the subject invention that the panels and support structure of the invention be sufficiently rugged to withstand children play activities, bad weather, and vandalism.

It is an additional object of the subject invention that the manufacture and assembly of the invention be quick and economical.

It is an additional object of this invention that the panel edges be partially relieved and attached to the support structure by noncontinuous electric-arc welding, so as to eliminate any concealed panel edges which would not be covered by coating after assembly of the panels to the support structure.

The panels are cut to desired dimensions from solid metal sheets, such as about 11 guage thickness steel for panels which are about three feet on a side. The appropriate thickness depends on the particular metal and the dimensions of the panel.

Some openings can be cut in the panels to allow supervisors to observe the children. In addition or alternately, designs such as stencil-like animal patterns can be incorporated in the panels by cutting narrow, discontinuous openings in the panels using manufacturing methods known in the industry such as flame-cutting, laser-cutting, or a turret-type punch pressing. These designs can be cut through an entire panel or through just a fraction of its thickness. Narrow, discontinuous openings which are less than about a quarter inch wide will not significantly affect the strength of the steel, but still will allow efficient coating of all exposed surfaces throughout the thickness of a panel.

Panels are electric-arc welded to a metal support structure. A rectangular panel which is about three feet on a side can be attached effectively and efficiently with about one inch welds in the corners and in about three intermediate tab positions on each side. By partially relieving the panel edges by means such as a press operation, or one of the other methods mentioned previously, the panel will contact the metal support structure only where a weld is desired. The parts of the panel edges which are not welded will then be about a quarter inch from the support structure, and every exposed surface of the combined assembly can then be covered efficiently using powder coating techniques. The importance of using electric-arc welding, as opposed to clamps or bolts, etc., is that arc welding does not leave exposed surfaces which are not coated (such as underneath a clamp), which thereby would be susceptible to early corrosion. The advantage of coating the combined assembly is that it is more efficient and economical than coating all of the parts separately prior to assembly.

The method described leads to an assembly satisfying safety, strength, and aesthetic requirements while maintaining economical short-run production costs. The metal support structure allows a mounting method which is common with that of other play components of a modular playground structure, and allows the panels to blend in with existing playground designs from engineering and aesthetic perspectives. Cutting a design into the metal panels is an economical method of decorating the panels and also prevents mutilation of the design by vandals.

DETAILED DESCRIPTION

Figure 1:
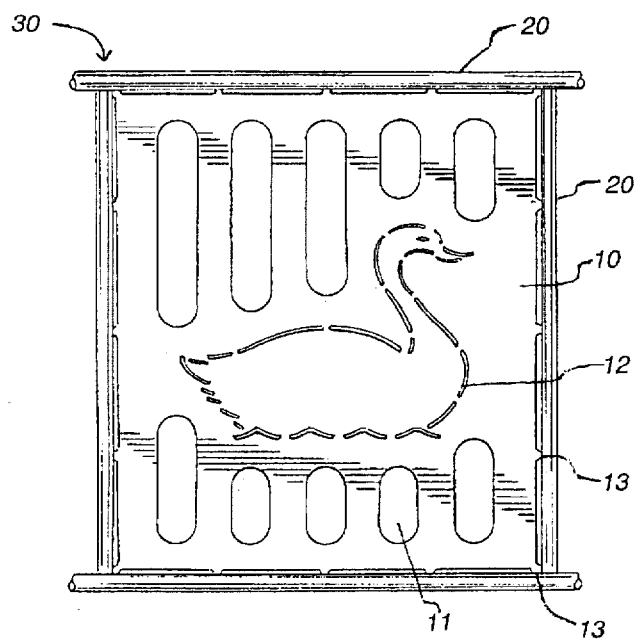
FIG. 1 is a front view of a panel made and attached to a structure in accordance with the subject invention.
Figure 2:
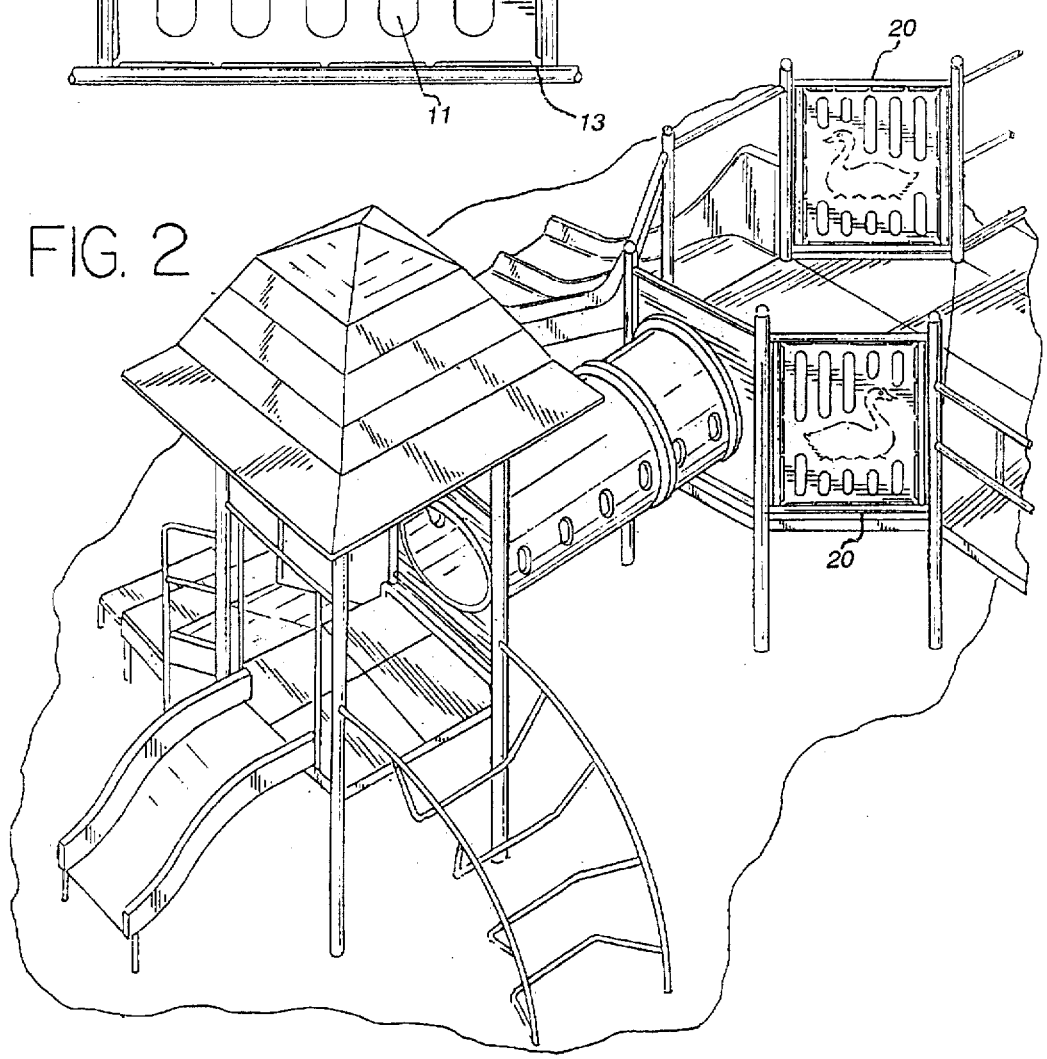
FIG. 2 is a perspective view of the assembly of FIG. 1 in use as a component of playground equipment.

FIGS. 1 and 2 show panels 10 made and attached to supporting structure 20 in accordance with the subject invention. The panels 10 are cut to desired dimensions from solid metal sheets, such as about 11 guage thickness steel for panels 10 which are about three feet on a side. The panels 10 will not be sufficiently rugged if they are too thin, but the advantages of added thickness diminish quickly and can be overcome by the disadvantages of unnecessarily heavy and expensive panels 10. The appropriate thickness depends on the particular metal and the dimensions of the panel 10.

Some openings 11 can be cut in the panels 10 to allow supervisors to observe the children. In addition or alternately, designs such as stencil-like animal patterns can be incorporated in the panels 10 by cutting narrow, discontinuous openings 12 in the panels using manufacturing methods known in the industry such as flame-cutting, laser-cutting, or a turret-type punch pressing. These designs can be cut through an entire panel or through just a fraction of its thickness. Narrow, discontinuous openings 12 which are less than about a quarter inch wide will not significantly affect the strength of the steel and will not violate recognized standards regarding the size of holes which can entrap and injure children. The minimum width openings which can be cut and which will show the design patterns still will allow efficient coating of all exposed areas throughout the thickness of a panel 10.

Panels 10 are electric-arc welded to a metal support structure 20. A rectangular panel 10 which is about three feet on a side can be attached effectively and efficiently with about one inch welds 13 in the corners and in about three intermediate tab positions on each side. By partially relieving the panel edges by means such as a press operation, or one of the other methods mentioned previously, the panel 10 will contact the metal support structure 20 only where a weld 13 is desired. The parts of the panel edges which are not welded will then be about a quarter inch from the support structure 20, and every exposed surface of the combined assembly 30 can then be covered efficiently using powder coating techniques.

The combined assembly 30 can be coated efficiently using powder coating techniques, or other coating methods such as spray painting. Powder coating is an efficient method of coating metal known in the industry. It is a type of electrodeposition in which a powder, such as a polyester powder, is deposited on a metal surface by an electric current. Electrodeposition is based on electric conductance by the transport of charged particles of atomic or larger size, as distinguished from metallic conductance which is due to the movement of electrons. In the application of the present invention, the combined assembly 30 may be transported through a powder coating assembly line. Sufficient difference in electric potential is maintained between the metal assembly 30 (the cathode) and charged particles in the powder to result in electrodeposition of the powder on the metal assembly 30.

The importance of using electric-arc welding, as opposed to clamps or bolts, etc., is that arc welding does not leave exposed surfaces which are not coated (such as underneath a clamp or bolthead), which thereby would be susceptible to early corrosion. The advantage of coating the combined assembly 30 is that it is more efficient and economical than coating all of the parts separately prior to assembly.

The method described leads to an assembly 30 satisfying safety, strength, and aesthetic requirements while maintaining economical short-run production costs.

It should be understood that implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A method for making and assembling a metal panel on a metal support structure for use as a wall bordering a platform in children's playground equipment, the method comprising the steps of:

cutting the panel to desired dimensions compatible with the support structure;

cutting a decorative pattern on the panel;

electric-arc welding the panel to the support structure at selected sites, wherein the panel has at least three edges and the selected sites are tabs formed by partially relieving each of the edges of the panel, so that the panel will contact the support structure only at the tabs and the relieved edges will be spaced from the support structure; and coating the assembled panel and support structure.

2. A method for making and assembling a metal panel on a metal support structure as set forth in claim 1, wherein the coating step is accomplished by powder coating.

3. A method for making and assembling a metal panel on a metal support structure as set forth in claim 1, further comprising the step of cutting at least one opening in the panel prior to the coating step, so that an object on the platform may be observed through the opening.

4. A method for making and assembling a metal panel on a metal support structure as set forth in claim 3, wherein the coating step is accomplished by powder coating.

5. A method for making and assembling a metal panel on a metal support structure as set forth in claim 3, wherein the pattern cutting step and the opening cutting step are accomplished with a technique selected from the group consisting of flame-cutting, laser-cutting, and turret-type punch pressing.

6. A method for making and assembling a metal panel on a metal support structure as set forth in claim 5, wherein the coating step is accomplished by powder coating.

7. A method for making and assembling a metal panel on a metal support structure as set forth in claim 1, wherein the pattern cutting step includes cutting narrow, discontinuous openings in the panel.

8. A method for making and assembling a metal panel on a metal support structure as set forth in claim 7, wherein the coating step is accomplished by powder coating.

9. A method for making and assembling a metal panel on a metal support structure as set forth in claim 7, wherein the pattern cutting step is accomplished with a technique selected from the group consisting of flame-cutting, laser-cutting, and turret-type punch pressing.

10. A method for making and assembling a metal panel on a metal support structure as set forth in claim 9, wherein the coating step is accomplished by powder coating.

11. A method for making and assembling a metal panel on a metal support structure as set forth in claim 1, wherein the edges of the panel are relieved with a technique selected from the group consisting of flame-cutting, laser-cutting, and turret-type punch pressing.

12. A method for making and assembling a metal panel on a metal support structure as set forth in claim 11, wherein the coating step is accomplished by powder coating.

13. A method for making and assembling a metal panel on a metal support structure as set forth in claim 11, further comprising the step of cutting at least one opening in the panel prior to the coating step, so that an object on the platform may be observed through the opening.

14. A method for making and assembling a metal panel on a metal support structure as set forth in claim 13, wherein the coating step is accomplished by powder coating.

15. A method for making and assembling a metal panel on a metal support structure as set forth in claim 13, wherein the pattern cutting step includes cutting narrow, discontinuous openings in the panel.

16. A method for making and assembling a metal panel on a metal support structure as set forth in claim 15, wherein the coating step is accomplished by powder coating.

17. A method for making and assembling a metal panel on a metal support structure as set forth in claim 13, wherein the pattern cutting step and the opening cutting step are accomplished with a technique selected from the group consisting of flame-cutting, laser-cutting, and turret-type punch pressing.

18. A method for making and assembling a metal panel on a metal support structure as set forth in claim 17, wherein the coating step is accomplished by powder coating.

19. A method for making and assembling a metal panel on a metal support structure as set forth in claim 17, wherein the pattern cutting step includes cutting narrow, discontinuous openings in the panel.

20. A method for making and assembling a metal panel on a metal support structure as set forth in claim 19, wherein the coating step is accomplished by powder coating.

* * * * *